(12) United States Patent
Lenz et al.

(10) Patent No.: US 7,081,540 B2
(45) Date of Patent: Jul. 25, 2006

(54) PIGMENT COMPOSITIONS AND PIGMENTED WATER-BASED COATING MATERIALS

(75) Inventors: Roman Lenz, Liestal (CH); Olof Wallquist, Therwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 124 days.

(21) Appl. No.: 10/475,479

(22) PCT Filed: Apr. 16, 2002

(86) PCT No.: PCT/EP02/04212

§ 371 (c)(1),
(2), (4) Date: Oct. 20, 2003

(87) PCT Pub. No.: WO02/085987

PCT Pub. Date: Oct. 31, 2002

(65) Prior Publication Data

US 2004/0116559 A1    Jun. 17, 2004

(30) Foreign Application Priority Data

Apr. 24, 2001  (CH) .................................. 743/01

(51) Int. Cl.
*C07D 209/02* (2006.01)
*C07D 209/04* (2006.01)
*C07D 487/02* (2006.01)
(52) U.S. Cl. ...................................... 548/452; 548/453
(58) Field of Classification Search ................ 548/453, 548/305.1, 311.7, 364.7, 452
See application file for complete search history.

(56) References Cited

U.S. PATENT DOCUMENTS

| 4,490,542 A | 12/1984 | Iqbal et al. | 548/453 |
| 4,579,949 A | 4/1986 | Rochat et al. | 546/167 |
| 4,720,305 A | 1/1988 | Iqbal et al. | 106/288 |
| 5,476,949 A | 12/1995 | Wallquist et al. | 548/453 |
| 5,708,188 A * | 1/1998 | Hao et al. | 548/453 |
| 5,821,373 A | 10/1998 | Hao et al. | 548/453 |

(Continued)

FOREIGN PATENT DOCUMENTS

DE    4037556    5/1991

(Continued)

*Primary Examiner*—Kamal A. Saeed
*Assistant Examiner*—Susannah L. Chung
(74) *Attorney, Agent, or Firm*—Joseph C. Suhadolnik

(57) ABSTRACT

Compositions comprising water-based coating materials and a ternary 1,4-diketo-3,6-diphenylpyrrolo[3,4-c]pyrrole composition comprising compounds of formulae (I), (II) and (III), wherein $X_1$ and $X_2$ are each independently of the other hydrogen or chlorine, with the proviso that $X_1$ and $X_2$ are not simultaneously hydrogen, and $R_1$ and $R_2$ are each independently of the other hydrogen, $C_1$–$C_6$alkyl, chlorine, bromine, $C_1$–$C_6$trifluoroalkyl, $C_1$–$C_6$alkoxy or a phenyl radical unsubstituted or substituted by $C_1$–$C_6$alkyl, chlorine, bromine or by $C_1$–$C_6$alkoxy, with the proviso that compounds of formulae (I), (II) and (III) are different, and also a process for the preparation thereof, and novel ternary 1,4-diketo-3,6-diphenyl-pyrrolo[3,4-c]pyrrole compositions, and the use thereof in the pigmenting of high or low molecular weight material

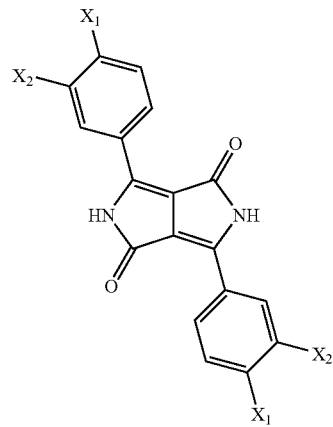

(I)

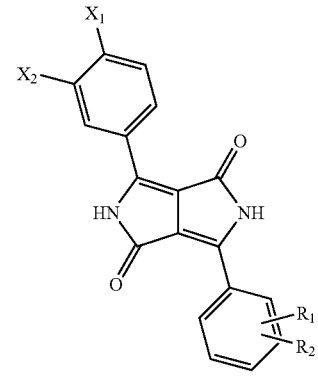

(II)

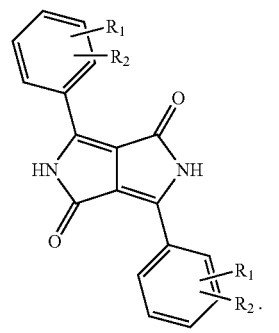

(III)

6 Claims, No Drawings

U.S. PATENT DOCUMENTS

| | | | |
|---|---|---|---|
| 6,036,766 A | 3/2000 | Hendi et al. | 106/494 |
| 6,107,491 A * | 8/2000 | Eldin | 548/453 |
| 6,616,750 B1 | 9/2003 | Lenz et al. | 106/498 |

FOREIGN PATENT DOCUMENTS

| | | |
|---|---|---|
| EP | 0061426 | 9/1982 |
| EP | 0094911 | 11/1983 |
| EP | 0181290 | 5/1986 |
| EP | 0430875 | 6/1991 |
| EP | 0640603 | 3/1995 |
| EP | 0962499 | 12/1999 |
| EP | 1120444 | 8/2001 |
| GB | 2238550 | 6/1991 |

* cited by examiner

PIGMENT COMPOSITIONS AND PIGMENTED WATER-BASED COATING MATERIALS

The present invention relates to compositions comprising water-based coating materials and a ternary 1,4-diketo-3,6-diphenylpyrrolo[3,4-c]pyrrole composition comprising compounds of formulae (I), (II) and (III),

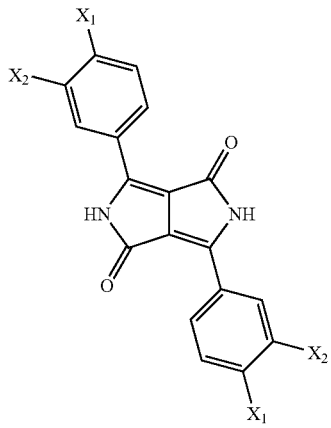
(I)

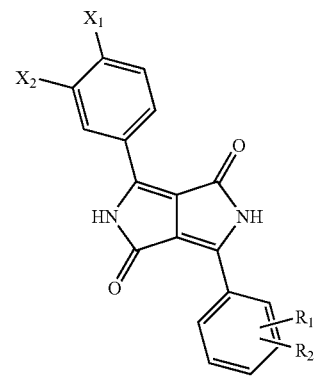
(II)

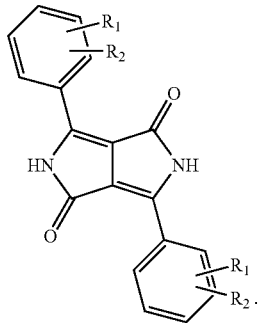
(III)

wherein $X_1$ and $X_2$ are each independently of the other hydrogen or chlorine, with the proviso that $X_1$ and $X_2$ are not simultaneously hydrogen, and $R_1$ and $R_2$ are each independently of the other hydrogen, $C_1$–$C_6$alkyl, chlorine, bromine, $C_1$–$C_6$perfluoroalkyl, $C_1$–$C_6$alkoxy or a phenyl radical unsubstituted or substituted by $C_1$–$C_6$alkyl, chlorine, bromine or by $C_1$–$C_6$alkoxy, with the proviso that compounds of formulae (I), (II) and (III) are different, and also to a process for the preparation thereof, and to novel ternary 1,4-diketo-3,6-diphenylpyrrolo[3,4-c]pyrrole compositions, and to the use thereof for the pigmenting of high or low molecular weight material.

For many years strenuous efforts have been made to reduce or avoid solvent emissions during the processing of surface-coatings (lecture by G. Wilker, Clariant GmbH, Organic pigments for Waterborne OEM paints, 10 th to 12 th Feb. 1999, given at the "International Waterborne, High-Solids, and Powder Coatings Symposium" in New Orleans, La., USA).

EP-A-430 875 discloses pigmented water-based coating materials containing sulfo-group-substituted 1,4-diketo-3,6-diphenylpyrrolo[3,4-c]pyrrole or quinacridone pigments. 1,4-Diketo-3,6-diphenylpyrrolo[3,4-c]pyrroles derivatised with sulfo groups have the disadvantage that their preparation requires an additional process step. In addition, the introduction of the sulfo groups is a critical problem from the ecological and work hygiene standpoints because of the use of sulfonation reagents such as oleum, sulfuric acid, liquid sulfur trioxide and chlorosulfonic acid.

It is known from G. Wilker's lecture (see above, page 371) that 1,4-diketo-3,6-diphenylpyrrolo[3,4-c]pyrroles, for example the ternary diketopyrrolopyrrole mixture Colour Index P.R. 270 and the diketopyrrolopyrrole pigment Colour Index P.R. 255, have little suitability for pigmented water-based coating materials on account of their poor fastness to overspraying.

Some ternary 1,4-diketo-3,6-diphenylpyrrolo[3,4-c]pyrrole compositions are known and are described, for example, in U.S. Pat. No. 4,579,949, U.S. Pat. No. 6,057,449, U.S. Pat. No. 4,490,542, U.S. Pat. No. 5,476,949 and U.S. Pat. No. 4,720,305.

U.S. Pat. No. 4,579,949 discloses ternary 1,4-diketo-3,6-diphenylpyrrolo[3,4-c]pyrrole compositions that are prepared from equimolar amounts of 4-chlorobenzonitrile and 3-chlorobenzonitrile (Example 34) or 4-chlorobenzonitrile and benzonitrile (Example 26) or 4-methyl- and 4-chlorobenzonitrile (Example 37) with a succinic acid diester and are subsequently protonated in the presence of acid and conditioned.

U.S. Pat. No. 6,057,449 discloses 1,4-diketo-3,6-diphenylpyrrolo[3,4-c]pyrrole compositions that are prepared from 4-chlorobenzonitrile and 3-chlorobenzonitrile (Example 42), or 4-chlorobenzonitrile and benzonitrile (Example 34), or 3,4-dichlorobenzonitrile and 4-methylbenzonitrile (Example 47), each In equimolar amounts of benzonitriles, with a succinic acid diester in the presence of a crystal growth inhibitor.

U.S. Pat. No. 4,490,542, Example 44, discloses a 1,4-diketo-3,6-diphenylpyrrolo[3,4-c]pyrrole composition that is prepared from equimolar amounts of 4-chlorobenzonitrile and 3,4-dichlorobenzonitrile with bromoacetic acid ester in the presence of Zn—Cu. That 1,4-diketo-3,6-diphenylpyrrolo[3,4-c]pyrrole composition dyes polyvinyl chloride red. Furthermore, U.S. Pat. No. 4,490,542, Example 26, discloses a 1,4-diketo-3,6-diphenylpyrrolo[3,4-c]pyrrole composition that is prepared from equimolar amounts of 4-chlorobenzonitrile and 4-methylbenzonitrile with bromoacetic acid ester in the presence of Zn—Cu.

U.S. Pat. No. 4,720,305, Examples 25, 26, 27, discloses a binary 1,4-diketo-3,6-diphenylpyrrolo[3,4-c]-pyrrole composition that is prepared from equimolar amounts of 4-chlorobenzonitrile and 3,4-dichlorobenzonitrile by reaction with a lactam.

U.S. Pat. No. 5,476,949, Example 1, discloses a ternary 1,4-diketo-3,6-diphenylpyrrolo[3,4-c]pyrrole composition that is prepared from equimolar amounts of 4-chlorobenzonitrile and benzonitrile by reaction with a succinic acid diester and is subsequently protonated in the presence of acid and conditioned.

The aim of the present invention was to find a replacement for sulfo-group-containing pigments suitable for the pigmenting of water-based coating materials. The pigments should preferably be finely divided. Water-based coating materials comprising such pigments should be distinguished by good fastness properties, especially fastness to over-spraying and to weathering, and should preferably exhibit high transparency and low fluorescence. Furthermore, the pigments should be obtainable by means of a simple, environmentally friendly and economical preparation process and should be suitable for the pigmenting of high or low molecular weight materials, especially paints, printing inks, plastics or fibres.

Accordingly, the compositions defined at the beginning have been found.

Coating materials in the context of the present invention are, for example, paints and especially lacquers, for example for the automotive industry.

Water-based coating materials containing water and polymer.

Polymers include also copolymers or combinations of polymers and copolymers. For example, polymer denotes methacrylate, acrylate, polyurethane, polyester or polyisocyanate or a combination thereof, such as acrylic/polyester, also acrylic/latex and water-soluble alkyd resins or epoxy resins that are crosslinkable e.g. with polyamines, or polyacetoacetate/polyketimine, and also polycarboxylic acid salts, for example polycarboxylic acid ammonium salts or polycarboxylic acid dialkylammonium salts, or polycarboxylic acid monoalkylammonium salts, or basic epoxy resin/polyamine acid salts, wherein acids are preferably low molecular weight acids, and also maleic anhydride adducts with unsaturated fatty acid esters. Progress in Organic Coatings 17, pages 27–29, (1989) and U.S. Pat. No. 4,489,135 and also U.S. Pat. No. 4,558,090 disclose, for example, water-based coating materials.

The water-based coating materials usually contain from 60 to 90% by weight water and from 10 to 40% by weight polymer or copolymer, the ratios by weight adding up to 100% by weight.

A preferred embodiment of the present invention relates to compositions comprising coating materials based on polyester/polyurethane and acrylic/latex and a ternary 1,4-diketo-3,6-di-phenylpyrrolo[3,4-c]pyrrole composition comprising compounds of formulae (I), (II) and (III).

Pigmented water-based coating materials that are preferred according to the invention for automotive finishes are polyester/polyurethane and acrylic/latex dispersions.

Especially preferred compositions according to the invention comprise ternary 1,4-diketo-3,6-diphenylpyrrolo[3,4-c]pyrrole compositions of formulae (IV), (V) and (VI)

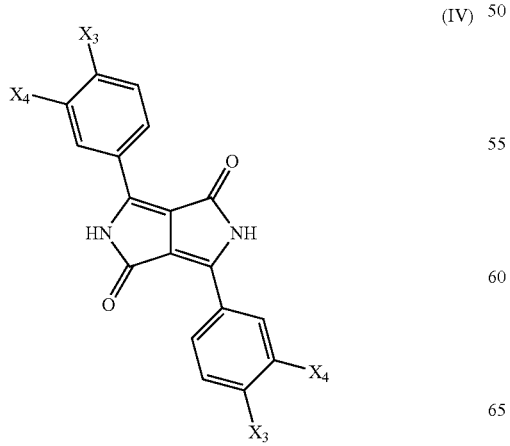

(IV)

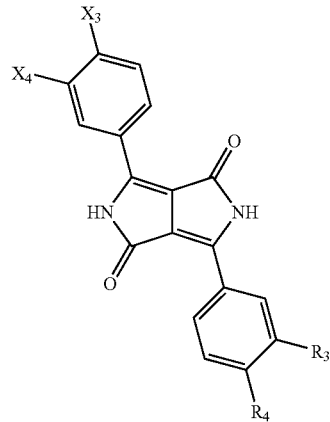

(V)

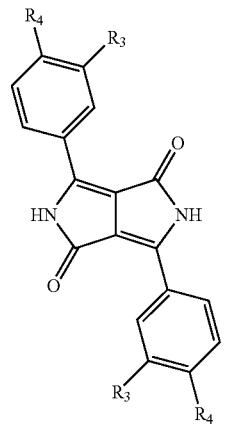

(VI)

wherein $X_3$ and $X_4$ are each independently of the other hydrogen or chlorine, but $X_1$ and $X_2$ are not simultaneously hydrogen, and $R_3$ and $R_4$ each independently of the other have the same meanings as defined above for $R_1$ and $R_2$, with the proviso that compounds of formulae (IV), (V) and (VI) are different.

In an especially preferred embodiment of the invention $X_3$ and $X_4$ are chlorine, and $R_3$ and $R_4$ each Independently of the other have the same meanings as defined above for $R_1$ and $R_2$; $R_3$ and $R_4$ are especially each independently of the other hydrogen, methyl, trifluoromethyl, methoxy, chlorine or an unsubstituted phenyl radical, with the proviso that compounds of formulae (IV), (V) and (VI) are different.

In a further especially preferred embodiment of the invention $X_3$ and $X_4$ are each independently of the other hydrogen or chlorine, either $X_3$ or $X_4$ being hydrogen, and $R_3$ and $R_4$ each independently of the other have the same meanings as defined above for $R_1$ and $R_2$; $R_3$ and $R_4$ are especially each independently of the other hydrogen, methyl, trifluoromethyl, methoxy, chlorine or an unsubstituted phenyl radical, with the proviso that compounds of formulae (IV), (V) and (VI) are different.

Very especially $X_3$ and $R_3$ are hydrogen, and $X_4$ and $R_4$ are chlorine, or $X_3$ and $R_3$ are hydrogen, $X_4$ is chlorine, and
$R_4$ is a phenyl radical, or
$X_3$ and $X_4$ are chlorine,
$R_3$ is hydrogen, and
$R_4$ is methyl, or
$X_3$ and $X_4$ are chlorine,
$R_3$ is hydrogen, and
$R_4$ is chlorine or
$X_3$ and $X_4$ are chlorine,
$R_3$ is hydrogen, and
$R_4$ is a phenyl radical.

There have also been found novel ternary 1,4-diketo-3,6-diphenylpyrrolo[3,4-c]pyrrole compositions comprising compounds of formulae (VII), (VII) and (IX)

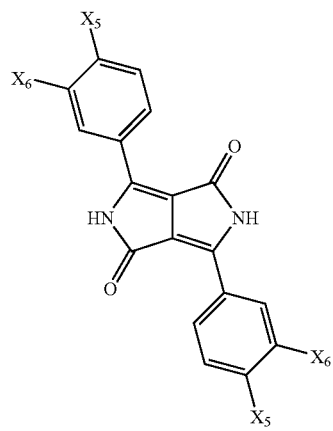
(VII)

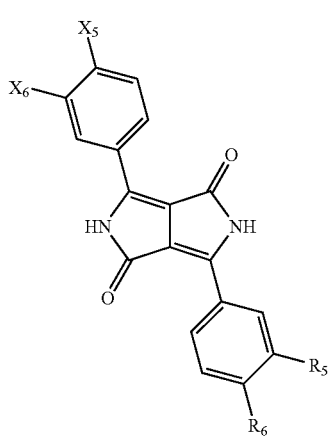
(VIII)

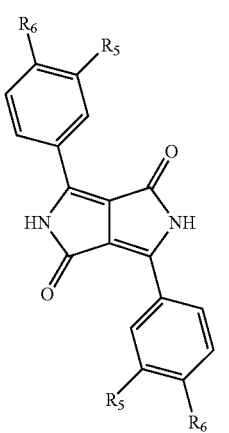
(IX)

wherein
$X_5$ is hydrogen and $X_6$ is chlorine, and
$R_5$ and $R_6$ are each independently of the other hydrogen, $C_1$–$C_6$alkyl, chlorine, bromine, $C_1$–$C_6$perfluoroalkyl, $C_1$–$C_6$alkoxy or a phenyl radical unsubstituted or substituted by $C_1$–$C_6$alkyl, chlorine, bromine or by $C_1$–$C_6$alkoxy; especially hydrogen, methyl, methoxy, tert-butyl, trifluoromethyl, chlorine or an unsubstituted phenyl radical,
more especially $R_5$ is hydrogen and $R_6$ is an unsubstituted phenyl radical or chlorine, and very especially $R_5$ is hydrogen and $R_6$ is unsubstituted phenyl, with the proviso that compounds of formulae (VII), (VII) and (IX) are different, or
$X_5$ and $X_6$ are chlorine, and
$R_5$ and $R_6$ are each independently of the other hydrogen, $C_1$–$C_6$alkyl, chlorine, bromine, $C_1$–$C_6$perfluoroalkyl, $C_1$–$C_6$alkoxy or a phenyl radical unsubstituted or substituted by $C_1$–$C_6$alkyl, chlorine, bromine or by $C_1$–$C_6$alkoxy, with the proviso that a composition comprising compounds of formulae (VII), (VII) and (IX) wherein $X_5$, $X_6$ and $R_6$ are chlorine and $R_5$ is hydrogen is excluded, and especially $R_5$ is hydrogen, methyl, methoxy, tert-butyl, trifluoromethyl, chlorine or an unsubstituted phenyl radical, and $R_6$ is hydrogen or an unsubstituted phenyl radical or chlorine, more especially $R_5$ is hydrogen and $R_6$ is chlorine, with the proviso that compounds of formulae (VII), (VII) and (IX) are different, or
$X_5$ is chlorine, and
$R_5$ and $X_6$ are hydrogen, and
$R_6$ is a substituted or unsubstituted phenyl radical, with the proviso that compounds of formulae (VII), (VII) and (IX) are different.

Furthermore, the use of the compounds of formulae (VII), (VIII) and (IX) for the pigmenting of high or low molecular weight material, and a process for their preparation, have been found.

There has also been found a ternary 1,4-diketo-3,6-diphenylpyrrolo[3,4-c]pyrrole composition comprising compounds of formulae (VII), (VIII) and (IX)

wherein
$X_5$ and $X_6$ are chlorine,
$R_5$ is hydrogen and
$R_6$ is chlorine, which composition does not result in red dyeings; preferably dyeings having a hue angle h of h>39 are obtained (the hue angle h is defined in the L*C*h system of the Commission Internationale de l'Eclairage, L* being a measure of lightness and C* a measure of saturation).

The dyeings are prepared, for example, according to Example 1h of the present invention.

There has also been found a ternary 1,4-diketo-3,6-diphenylpyrrolo[3,4-c]pyrrole composition comprising compounds of formulae (VII), (VIII) and (IX)

wherein
$X_5$ is chlorine and $R_6$ is methyl and $X_6$ and $R_5$ are hydrogen, which composition results in transparent dyeings, especially having a relative transparency ΔTr>5 compared with U.S. Pat. No. 4,490,542, Example 26.

Preferably that composition has a particle size of <0.1μ, especially <0.08μ.

The transparent dyeings are prepared, for example, in accordance with Example 1h of the present invention.

The dyeings according to the invention comprise the compositions according to the invention and high or low molecular weight material.

$C_1$–$C_6$Alkyl is methyl, ethyl, propyl, isopropyl, n-butyl, sec-butyl, tert-butyl, n-pentyl, sec-amyl, tert-amyl, hexyl, 2,2'-dimethylbutyl.

$C_1$–$C_6$Alkoxy is methoxy, ethoxy, propoxy, isopropoxy, n-butoxy, sec-butoxy, tert-butoxy, n-pentyloxy, sec-amyloxy, tert-amyloxy, hexyloxy, 2,2'-dimethylbutoxy.

The present invention relates also to a process for the preparation of the compositions according to the invention comprising water-based coating materials and a ternary 1,4-di-keto-3,6-diphenylpyrrolo[3,4-c]pyrrole composition comprising compounds of formulae (I), (II) and (III), wherein the ternary 1,4-diketo-3,6-diphenylpyrrolo[3,4-c]pyrrole composition comprising compounds of formulae (I), (II) and (III) and a water-based coating material are brought into contact with one another.

A ternary 1,4-diketo-3,6-diphenylpyrrolo[3,4-c]pyrrole composition and a water-based coating material are usually brought into contact by customary methods of mixing.

In a preferred embodiment, the ternary 1,4-diketo-3,6-diphenylpyrrolo[3,4-c]pyrrole composition is incorporated into the coating material by dispersion.

If desired, further additives can be added to the coating material before, during or after the dispersing operation.

Examples of further additives may include binders, solvents, especially water-soluble solvents and dissolution aids, and also non-volatile constituents or texture auxiliaries.

As water-soluble solvents there are usually used, for example, glycol monoethers, such as ethylene glycol monomethyl, monoethyl or monobutyl ether, and also ethylene glycol, diethyllene glycol, propylene glycol, aliphatic alcohols, such as ethanol, propanol, butanol, isobutanol or amyl alcohol, ketones, for example methyl ethyl ketone, methyl isobutyl ketone or diacetone alcohol, also N,N'-dimethylformamide or N-methylpyrrolidone.

Non-volatile constituents are usually, for example, dispersants, adjuvants, light stabilisers, anti-oxidants and inorganic pigments, such as black pigments, and also metal particles or powders, such as aluminium powder or copper powder or mica.

Suitable texture improvers include, for example, fatty acids having at least 12 carbon atoms, such as, especially, stearic or behenic acid, stearic or behenic acid amide, salts of stearic or behenic acid, such as magnesium, zinc or aluminium stearate or behenate, also quaternary ammonium compounds, such as, especially, tri($C_1$–$C_4$)alkylbenzylammonium salts, e.g. trimethyl-, triethyl-, tri-n-propyl-, tri-isopropyl-, tri-n-butyl-, tri-sec-butyl- and tri-tert-butyl-benzylammonium salts, and also plasticisers, such as epoxidised soybean oil, waxes, such as polyethylene wax, resin acids, such as abietic acid, colophony soap, hydrogenated or dimerised colophony, ($C_{12}$–$C_{18}$)paraffindisulfonic acid, alkylphenols and alcohols, such as stearyl alcohol. Also suitable are lauryl amine and stearyl amine, as well as aliphatic 1,2-diols, such as 1,2-dodecanediol.

Preferred texture improvers are lauryl amine and stearyl amine, aliphatic 1,2-diols, stearic acid and its amides, salts and esters, epoxidised soybean oil, waxes and resin acids.

The preparation of the 1,4-diketo-3,6-diphenylpyrrolo[3,4-c]pyrrole compositions according to the invention is usually carried out analogously to processes described in U.S. Pat. No. 4,579,949 or U.S. Pat. No. 5,476,949 by reacting differently substituted benzonitriles with a succinic acid diester.

Accordingly, the present invention relates to a process for the preparation of the 1,4-diketo-3,6-diphenylpyrrolo[3,4-c]pyrrole compositions according to the invention comprising pigments of formulae (I), (II) and (III) and also (VII), (VIII) and (IX), by reaction of succinic acid diesters with two differently substituted benzonitriles in an organic solvent in the presence of a base at elevated temperature to form a pigment salt suspension and subsequent freeing of the ternary 1,4-diketo-3,6-diphenylpyrrolo[3,4-c]pyrrole composition, wherein a) two differently substituted benzonitriles of formulae (X) and (XI)

(X)

(XI)

wherein
$X_1$ and $X_2$ and $R_1$ and $R_2$ are as defined above in compounds of formulae (I), (II) and (III), are reacted in a molar ratio in the range of from 99.9 to 0.1 mol % of benzonitrile of formula (X) to from 0.1 to 99.9 mol % of benzonitrile of formula (XI) to form a pigment salt, and b) the pigment salt from process step a) is then protonated, and in a preferred embodiment of the process according to the invention, c) subsequently conditioned.

The total concentration of the nitrites in the organic solvent is usually selected in the range of from 5 mol/l to 0.5 mol/l.

The molar ratio of base to succinic acid diester is generally in the range of from 0.1 to 10 mol of base to 1 mol of succinic acid diester.

The pressure chosen is preferably atmospheric pressure.

The reaction temperature in process step a) is usually in the range of from 60 to 140° C., preferably in the range of from 80 to 120° C.

The duration of the reaction in process step a) is usually chosen in dependence upon the selected temperature. It is generally in the range of from 30 minutes to 20 hours.

If desired, an amount of from 0.1 to 10.0% by weight, especially from 0.2 to 5.0% by weight, calculated on the total amount of nitrile, of an additional, structurally different nitrile of formula (X) can be added.

Organic solvents may be, for example, polar, apolar, protic or aprotic organic solvents. In detail, it is possible to use as solvent, for example, ethers, such as tetrahydrofuran, dioxane or glycol ethers, such as ethylene glycol methyl ether, ethylene glycol ethyl ether, diethylene glycol monomethyl ether or diethylene glycol monoethyl ether, or aromatic hydrocarbons, such as benzene or alkyl-, alkoxy- or halo-substituted benzene, such as toluene, xylene, anisole or chlorobenzene, dichloro- or trichloro-benzene, N,N'-dimethylacetamide, N-methylpyrrolidone, or aromatic N-heterocycles, such as pyridine, picoline or quinoline, or alcohols, such as primary, secondary and tertiary alcohols, such as methanol, ethanol, propanol, isopropanol, tert-butanol, pentanol, sec-amyl alcohol or tert-amyl alcohol, also ethylene glycol or propylene glycol. The said solvents can also be used in the form of mixtures.

As base there may be used, for example, alkali metals, such as lithium, sodium or potassium, and also their hydroxides, such as lithium, sodium or potassium hydroxide, or their alkali metal amides, such as lithium, sodium or potassium amide, or their alkali metal hydrides, such as lithium, sodium or potassium hydride, or their alkali metal alcoholates, especially alcohols of $C_4$–$C_{10}$alkanes, e.g. calcium, magnesium, lithium, sodium or potassium tert-butanolate, tert-pentanolate, 2-methyl-2-pentanolate, 3-methyl-3-pentanolate and 3-ethyl-3-pentanolate.

Succinic acid diesters are symmetric or asymmetric diesters, preferably symmetric diesters. It is preferable to use succinic acid dialkyl esters, such as succinic acid di($C_1$–$C_{12}$alkyl) esters, preferably succinic acid di($C_1$–$C_8$alkyl) esters and especially succinic acid di($C_1'$–$C_5$alkyl) esters, and also succinic acid diaryl and succinic acid monoaryl monoalkyl esters, wherein aryl may be unsubstituted or substituted, for example, by one or two halogen radicals, $C_1$–$C_6$alkyl or $C_1$–$C_6$alkoxy. Aryl is preferably phenyl.

Special preference is given to succinic acid diesters, such as succinic acid dimethyl ester, diethyl ester, dipropyl ester, dibutyl ester, dipentyl ester, diheptyl ester, dioctyl ester, diisopropyl ester, diheptyl ester, di-sec-butyl ester, di-tert-butyl ester, di-tert-amyl ester, di[1,1-dimethylbutyl] ester, di[1,1,3,3-tetramethylbutyl] ester, di[1,1-dimethylpentyl] ester, di[1-methyl-1-butyl] ester, di[1,1-dimethylpentyl] ester, di[1-methyl-1-ethyl-butyl] ester, di[1,1-diethylpropyl] ester, diphenyl ester, di[4-methylphenyl] ester, di[2-methylphenyl] ester, di[4-chlorophenyl] ester, di[2,4-chlorophenyl] ester or monoethyl monophenyl ester.

The succinic acid diesters listed above are known compounds, some of which are comercially available.

The pigment salt obtained in process step a) is usually protonated in water and/or an alcohol, preferably in a water/alcohol mixture.

The water/alcohol mixture can be used in any desired mixing ratios.

It has proved advantageous to use a mixture of water and alcohol in a ratio of 90–20:10–80% by volume, preferably 90–30:10–70% by volume and especially 85–40:15–60% by volume. Special preference is given to a mixture of water and methanol in a ratio by volume of 5:1. It has also proved advantageous to use the mixture of water and alcohol, for example, in an amount of from 5 to 20 parts by weight, based on one part by weight of pigment salt.

If desired, the pigment salt is protonated in the presence of an acid stronger than water or alcohol.

This relatively strong acid can be added to the water/alcohol mixture or to the mixture of pigment salt and water/alcohol mixture.

It is preferable to carry out the protonation without the addition of a relatively strong acid.

Depending upon the temperature and the starting material, the acid is advantageously used in an amount of from 0.5 to 3 equivalents, preferably from 1 to 2 equivalents, based on the base, especially in an amount sufficient to obtain a pH<7 at the end of the conditioning.

The temperature during the protonation in process step b) is usually in the range of from −20 to 50° C., preferably in the range of from 0 to 50° C., and especially in the range of from 15 to 50° C.

The time period for the protonation is usually chosen in dependence upon the selected temperature. It is generally in the range of from 10 minutes to 2 hours.

For protonation it is possible either to add the pigment salt to water and/or alcohol and, if desired, a relatively strong acid, or to add the pigment salt and a relatively strong acid simultaneously to water and/or alcohol, or to add a relatively strong acid only after the addition of the pigment to water and/or alcohol.

The pigment salt is preferably discharged into a water/alcohol mixture. It has proved advantageous to add the pigment salt slowly.

As relatively strong acid it is possible to use, for example, an inorganic acid, e.g. hydrochloric acid, phosphoric acid and especially sulfuric acid, or especially an aliphatic or aromatic organic carboxylic or sulfonic acid, e.g. formic acid, propionic acid, butyric acid, hexanoic acid, oxalic acid, benzoic acid, phenylacetic acid, benzenesulfonic acid, p-toluenesulfonic acid and especially acetic acid, or a mixture of the above acids.

It has proved advantageous to carry out conditioning after the protonation.

The temperature during the conditioning in process step c) is usually in the range of from −20 to 100° C., preferably in the range of from 0 to 100° C., and especially in the range of from 15 to 80° C.

The time period for the conditioning is usually chosen in dependence upon the selected temperature. It is generally in the range of from 10 minutes to 48 hours.

In an especially preferred embodiment of the process according to the invention, the pigment salt is discharged into water and/or an alcohol at a temperature of from −20 to 50° C., if desired in the presence of a relatively strong acid, and treated for from 10 minutes to 48 hours at a temperature of from −20 to 100° C., preferably from 0 to 80° C., especially in the range of from 15 to 80° C.

A variant of the process according to the invention relates to protonation in the presence of a relatively strong acid, and a further variant relates to protonation without acid.

Depending upon the intended use, it may be advantageous for the 1,4-diketo-3,6-diphenylpyrrolo[3,4-c]pyrrole compositions according to the invention to be subjected to aftertreatment.

For example, aftertreatment can be used to influence the form of the pigment particles. Fine pigment particles can be produced, for example, by dry grinding with or without salt, by solvent grinding or aqueous grinding or by salt kneading and also by acidic or basic reprecipitation.

Aftertreatment can also be used to prepare pigments that result in transparent or opaque dyeings.

If an opaque pigment form is desired, it generally proves advantageous to carry out a thermal aftertreatment in water and/or organic solvent with or without base, optionally under pressure. It is preferable to use organic solvents, such as benzenes substituted by halogen atoms, alkyl groups or nitro groups, such as xylenes, chlorobenzene, o-dichlorobenzene or nitrobenzene, and also pyridine bases, such as pyridine, picoline or quinoline, and also ketones, such as cyclohexanone, or alcohols, such as isopropanol, butanols or pentanols, also ethers, such as ethylene glycol monomethyl or monoethyl ether, or amides, such as N,N'-dimethylformamide or N-methylpyrrolidone, and also dimethyl sulfoxide or sulfolane. It is also possible to carry out the aftertreatment in water, optionally under pressure, in the presence of organic solvents and/or with the addition of surface-active substances.

If a transparent pigment form is desired, the pigment suspension can be conditioned after the protonation, for example as described in U.S. Pat. No. 5,476,949.

A special embodiment of the processes according to the invention relates to the preparation of the ternary 1,4-diketo-3,6-diphenylpyrrolo[3,4-c]pyrrole composition comprising compounds of formulae (VII), (VII) and (IX) wherein
$X_5$ and $X_6$ are chlorine,
$R_5$ is hydrogen and
$R_6$ is chlorine, which composition results in non-red dyeings, and also the ternary 1,4-diketo-3,6-diphenylpyrrolo[3,4-c]pyrrole composition comprising compounds of formulae (VII), (VIII) and (IX) wherein
$X_5$ is chlorine and $R_6$ is methyl and
$X_6$ and $R_5$ are hydrogen, which composition results in transparent dyeings, especially having a relative transparency of $\Delta Tr>5$ compared with U.S. Pat. No. 4,490,542, Example 26, or U.S. Pat. No. 4,579,949, Example 37.

Preferred embodiments of the process according to invention relate to the reaction of 3,4-dichlorobenzonitrile and 4-chlorobenzonitrile, or
of 3-chlorobenzonitrile and 4-chlorobenzonitrile, or
of 3-chlorobenzonitrile and 4-phenylbenzonitrile, or
of 3,4-dichlorobenzonitrile and 4-methylbenzonitrile, or
of 3,4-dichlorobenzonitrile and 3-methylbenzonitrile, or
of 4-chlorobenzonitrile and 4-methylbenzonitrile, in each case in a molar ratio of from 99.9 to 0.1:0.1 to 99.9 mol %.

Especially preferred embodiments of the process according to the invention relate to the reaction
of 3,4-dichlorobenzonitrile and 4-chlorobenzonitrile, or
of 3-chlorobenzonitrile and 4-chlorobenzonitrile, or
of 3-chlorobenzonitrile and 4-phenylbenzonitrile, or
of 3,4-dichlorobenzonitrile and 4-methylbenzonitrile, or
of 3,4-dichlorobenzonitrile and 3-methylbenzonitrile, or
of 4-chlorobenzonitrile and 4-methylbenzonitrile, in each case in a molar ratio of from 80 to 20:20 to 80 mol %.

Especially preferred embodiments of the process according to the invention relate to the reaction
of from 45 to 55 mol % 3,4-dichlorobenzonitrile and from 45 to 55 mol % 4-chlorobenzonitrile, or
of from 45 to 75 mol % 3-chlorobenzonitrile and from 25 to 55 mol % 4-chlorobenzonitrile, or
of from 45 to 55 mol % 3-chlorobenzonitrile and from 45 to 55 mol % 4-phenylbenzonitrile, or
of from 45 to 55 mol % 3,4-dichlorobenzonitrile and from 45 to 55 mol % 4-methylbenzonitrile, or
of from 45 to 55 mol % 3,4-dichlorobenzonitrile and from 45 to 55 mol % 3-methylbenzonitrile, or
of from 75 to 65 mol % 4-chlorobenzonitrile and from 25 to 35 mol % 4-methylbenzonitrile.

A further variant of the present invention relates to a process for the preparation of 1,4-di-keto-3,6-diphenylpyrrolo[3,4-c]pyrrole compositions wherein:
the individual 1,4-diketo-3,6-diphenylpyrrolo[3,4-c]pyrroles of formulae (I), (II), (III) or (VII), (VIII) and (IX)
are brought into contact in polar organic solvents, preferably by stirring at their boiling temperature, or
are reprecipitated in polar organic solvents in the presence of alkali metal alcoholates, alkali metal hydroxides or quaternary ammonium compounds, or
are treated with acid and precipitated by dilution with water, or
are subjected to intensive grinding or kneading and optionally simultaneously or subsequently recrystallised in water and/or organic solvents.

The individual 1,4-diketo-3,6-diphenylpyrrolo[3,4-c]pyrroles can be prepared by customary methods, for example as described in U.S. Pat. No. 4,579,949.

If desired, texture improvers, as defined above, can be added to the 1,4-diketo-3,6-diphenylpyrrolo[3,4-c]pyrrole compositions according to the invention.

Such additives can be added in amounts of from 0.05 to 20% by weight, preferably from 1 to 10% by weight, based on the composition according to the invention, before, during or after preparation thereof.

In a preferred embodiment of the present invention, the 1,4-diketo-3,6-diphenylpyrrolo-[3,4-c]pyrrole compositions according to the invention are obtainable by preparing them in accordance with one of the above processes according to the invention.

Very special preference is given to 1,4-diketo-3,6-diphenylpyrrolo[3,4-c]pyrrole compositions of formulae (VII), (VIII) and (IX) wherein
$X_5$ and $R_5$ are chlorine,
$R_5$ and $X_6$ are hydrogen, or
$X_5$ and $X_6$ are chlorine,
$R_5$ is hydrogen and
$R_6$ is chlorine, or
$X_6$ is chlorine,
$R_6$ is phenyl, and
$X_5$ and $R_5$ are hydrogen, which are obtainable by preparing them in accordance with one of the above processes according to the invention and optionally then conditioning them in accordance with one of the above processes according to the invention.

The compositions according to the invention comprising water-based coating materials and a ternary 1,4-diketo-3,6-diphenylpyrrolo[3,4-c]pyrrole composition comprising compounds of formulae (I), (II) and (III) are used especially in the production of basecoats, e.g. metallic paints, in so-called basecoat/clearcoat systems, for example in two-layer metallic paints.

If desired, the basecoat/clearcoat systems additionally comprise solvent-based binder systems, for example acrylic, alkyd, polyurethane, epoxy, phenolic, melamine, urea, polyester and cellulose ester resins or combinations thereof.

Preferred as binder for the clearcoat are heat-curable acrylic/melamine, alkyd/melamine or acrylic/urethane resin combinations.

The present invention relates to the use of the compositions according to the invention comprising water-based coating materials and a ternary 1,4-diketo-3,6-diphenylpyrrolo-[3,4-c]pyrrole composition in the preparation of basecoats, especially aqueous basecoats.

The thickness of the coatings may vary as desired and depends upon the application; the coating may have a thickness of, for example, from 3 to 60 µm.

The present invention relates also to basecoats, especially to metallic paints, comprising the water-based coating materials according to the invention and a ternary 1,4-diketo-3,6-diphenylpyrrolo[3,4-c]pyrrole composition or a ternary 1,4-diketo-3,6-diphenylpyrrolo[3,4-c]pyrrole composition according to the invention.

The clearcoat is usually from 30 to 60 µm thick.

The coating may have two or more layers, e.g. when used in the automotive industry. In that case the basecoat is covered by one or more clearcoats.

All layers and especially the clearcoat layer may contain additives, such as light stabilisers, UV stabilisers and antioxidants.

The present invention relates also to a process for the preparation of basecoats, which comprises applying to the substrate the compositions according to the invention comprising the water-based coating material according to the invention and a ternary 1,4-diketo-3,6-diphenylpyrrolo[3,4-c]pyrrole composition comprising compounds of formulae (I), (II) and (III), especially a homogenised composition according to the invention.

The composition according to the invention comprising water-based coating materials and a ternary 1,4-diketo-3,6-diphenylpyrrolo[3,4-c]pyrrole composition comprising compounds of formulae (I), (II) and (III) can be applied to the substrate, for example, by spreading, roller-application, spraying, immersion or coil-coating, and fully cured.

Substrates are advantageously, for example, wood, plastics, mineral supports and especially metal surfaces.

The compositions according to the invention comprising water-based coating materials and a ternary 1,4-diketo-3,6-diphenylpyrrolo[3,4-c]pyrrole composition comprising compounds of formulae (I), (II) and (III) enable transparent or opaque dyeings to be obtained. Transparent dyeings are preferred.

In some cases it can prove advantageous to combine the 1,4-diketo-3,6-diphenylpyrrolo-[3,4-c]pyrrole composition with other organic and/or inorganic pigments or dyes.

It can also be advantageous to combine pearlescent pigments with the diketopyrrolopyrrole compositions according to the invention. Examples of pearlescent pigments usually used are the so-called "pearl essence" titanium dioxide/mica pigments, which may also contain other coloured metal oxides, such as iron, cobalt, manganese or chromium oxide, and also aluminium powder or copper powder, and mica.

The ternary 1,4-diketo-3,6-diphenylpyrrolo[3,4-c]pyrrole composition is advantageously present in the compositions according to the invention in a concentration of from 0.1 to 20% by weight, preferably from 0.5 to 10% by weight, based on the dry coating layer.

The present invention relates also to basecoats comprising water-based coating materials and a ternary 1,4-diketo-3,6-diphenylpyrrolo[3,4-c]pyrrole composition.

The present invention relates also to two-layer metallic paints consisting of a basecoat according to the invention and a clearcoat.

Surface-coatings comprising the ternary 1,4-diketo-3,6-diphenylpyrrolo[3,4-c]pyrrole compositions according to the invention are distinguished by excellent fastness to overspraying and/or fastness to weathering.

In order to determine the fastness to overspraying, a testlayer containing the ternary 1,4-di-keto-3,6-diphenylpyrrolo[3,4-c]pyrrole composition according to the invention, as described in Examples 3a and 4d, is measured colorimetrically against a reference layer and the colour deviation is given in $\Delta E$.

$\Delta E$ is a measure of the colour difference defined in the L*C*h colour system of the Commission Internationale de l'Eclairage.

The surface-coatings according to the invention preferably have a fastness to overspraying of $\Delta E$ less than 6, especially of $\Delta E$ less than 4 and more especially of $\Delta E$ less than 3, especially of $\Delta E$ less than 1.5.

In order to determine the fastness to weathering, a weathered sample is measured colorimetrically against an unweathered reference sample, as described in Examples 3b and 4e, and the colour deviation is given in $\Delta E$. The fastness to weathering properties are determined after 4000 hours.

A further preferred embodiment of the present invention relates to the surface-coatings according to the invention having a fastness to weathering after 4000 hours of $\Delta E$ less than 5, especially of $\Delta E$ less than 3 and more especially of $\Delta E$ less than 2.

An especially preferred embodiment of the present invention relates to the surface-coatings according to the invention having a fastness to overspraying of $\Delta E$ less than 4 and a fastness to weathering after 4000 hours of $\Delta E$ less than 3.

Furthermore, the present invention relates to the use of the ternary 1,4-diketo-3,6-diphenylpyrrolo[3,4-c]pyrrole compositions according to the invention comprising compounds of formulae (I), (II), (III) and also (VII), (VIII) and (IX) for the pigmenting of low or high molecular weight organic material, especially the use thereof for the preparation of inks or colorants for paints, printing inks, mineral oils, lubricating greases or waxes, or coloured or pigmented plastics, non-impact-printing materials, colour filters, cosmetics, toners.

A further preferred embodiment of the present invention relates to the use of the ternary 1,4-diketo-3,6-diphenylpyrrolo[3,4-c]pyrrole composition comprising compounds of formulae (VII), (VII) and (IX) wherein $X_5$ and $X_6$ are chlorine,
$R_5$ is hydrogen and
$R_6$ is chlorine, which composition results in non-red dyeings, and also the ternary 1,4-diketo-3,6-diphenylpyrrolo[3,4-c]pyrrole composition comprising compounds of formulae (VII), (VII) and (IX) wherein $X_5$ is chlorine and $R_6$ is methyl and
$X_6$ and $R_5$ are hydrogen, which composition results in transparent dyeings, especially having a relative transparency of $\Delta Tr > 5$ compared with U.S. Pat. No. 4,490,542, Example 26, or U.S. Pat. No. 4,579,949, Example 37, for the pigmenting of low or high molecular weight organic material.

If desired, the products obtained in the synthesis can be converted into a disperse form. This can be achieved in a manner known per se. Depending upon the compound and the intended use, it has proved advantageous to use the colorants as toners or in the form of preparations.

Low molecular weight organic material may be, for example, mineral oil, lubricating grease or wax.

High molecular weight material having a molecular weight ($M_W$) of from $10^4$ to $10^8$ g/mol may be, for example, synthetic and/or natural substances, for example natural resins or drying oils, rubber or casein, or modified natural substances, such as chlorinated rubber, oil-modified alkyd resins, viscose, or cellulose ethers or esters, such as ethylcellulose, cellulose acetate, propionate or butyrate, cellulose acetobutyrate and nitrocellulose, but are especially completely synthetic organic polymers (thermosetting plastics and thermoplastics), as can be obtained by polymerisation, for example by polycondensation or polyaddition.

The class of the polymers includes, for example, polyolefins, such as polyethylene, polypropylene, polyisobutylene, also substituted polyolefins, such as polymerisation products of monomers, such as vinyl chloride, vinyl acetate, styrene, acrylonitrile, acrylic acid esters, methacrylic acid esters, fluorinated polymerisation products, such as polyfluoroethylene or polytrifluorochloroethylene or a tetrafluoroethylene/hexafluoropropylene mixed polymerisation product, and also copolymerisation products of the said monomers. Polypropylene is preferred.

From the range of polyaddition and polycondensation resins there may be used, for example, condensation products of formaldehyde with phenols, so-called phenoplasts, and condensation products of formaldehyde and urea or thiourea; also melamine, so-called aminoplasts; also the polyesters used as surface-coating resins, either saturated, such as alkyd resins, or unsaturated, such as maleic resins; also linear polyesters, polycarbonates, polyphenylene oxides or silicones, and silicone resins.

The high molecular weight organic material may also be a partially crystalline or amorphous plastics, such as LLDPE (linear low-density polyethylene). "Partially crystalline plastics" are to be understood as meaning plastics that on solidification form small crystalline nuclei or aggregates (for example spherulites or quadrites), including such materials that do this only in the presence of nucleating agents (for example organic pigments).

Plastics may be thermoplastic high molecular weight organic materials having a molecular weight ($M_W$) of from $10^4$ to $10^8$ g/mol, preferably from $10^5$ to $10^7$ g/mol. Where the plastics are partially crystalline, they usually have a degree of crystallinity ($X_C$) of from 10 to 99.9%, especially from 40 to 99%, more especially from 80 to 99%. Preferred partially crystalline plastics are homopolymers, block or random copolymers and terpolymers of ethylene, propylene, butylene, styrene and/or divinylbenzene, especially α-olefins, such as HDPE (high-density polyethylene), LDPE (low-density polyethylene), polypropylene and polystyrene, as well as polyesters, such as polyethylene terephthalate (PET) and thermoplastic ionomers. Especially preferred partially crystalline plastics are polyolefins, especially polyethylene of high-density and polypropylene. The partially crystalline plastics may also optionally comprise customary amounts of additives, for example stabilisers, optical brighteners, fillers and/or lubricants.

The said high molecular weight compounds may be present individually or in mixtures as plastic masses, melts or in the form of spinning solutions. They may also be in the form of their monomers or in the polymerised state in dissolved form as film formers or binders for surface-coatings or for printing inks, e.g. boiled linseed oil, nitrocellulose, alkyd resins, melamine resins and urea-formaldehyde resins or acrylic resins.

The present invention relates also to the use of the 1,4-diketo-3,6-diphenylpyrrolo[3,4-c]pyrrole compositions of formulae (VII), (VIII), (IX) according to the invention in the production of laminate prints, inks, for printing inks in printing processes, for flexographic printing, screen printing, the printing of packaging, security colour printing, intaglio printing or offset printing, for preliminary stages of printing and for printing textiles, for office or home use or for graphics applications, for example for paper goods, for whiteboards, for ballpoint pens, felt-tip pens, fibre-tip pens, cardboard, wood, woodstains, metal, stamp pads or inks for impact-printing processes (using impact printing ink ribbons), in the preparation of surface-coatings, for industrial or commercial use, for textile decoration and industrial labelling, for coil coatings or powder coatings or for automotive finishes, for high-solids (low-solvent), water-dilutable and/or metallic paints or for pigmented formulations for aqueous paints, preferably transparent lacquers; for the production of mineral oils, lubricating greases or waxes, in the preparation of coloured plastics for coatings, fibres, plates or shaped substrates, in the preparation of non-impact-printing material for digital printing, for thermal wax transfer printing, ink-jet printing or for thermal transfer printing, and also in the preparation of polymeric colour particles, toners, dry copy toners, liquid copy toners or electrophotographic toners.

The present invention relates also to inks comprising high molecular weight organic material and a tinctorially effective amount of the composition according to the invention.

Processes for the preparation of inks, especially for ink-jet printing, are generally known and are described, for example, in U.S. Pat. No. 5,106,412.

The inks can be produced, for example, by blending the 1,4-diketo-3,6-diphenylpyrrolo-[3,4-c]pyrrole compositions according to the invention with polymeric dispersants. Blending of the 1,4-diketo-3,6-diphenylpyrrolo[3,4-c]pyrrole compositions according to the invention with the polymeric dispersant is preferably carried out according to generally known methods of blending, such as stirring or mixing, the use of blending apparatus, such as Skandex, Dispermat or Rollbock, and intensive mixers, e.g. of the trademark Ultra-Turrax®, being especially recommended.

When blending the 1,4-diketo-3,6-diphenylpyrrolo[3,4-c]pyrrole compositions according to the invention with polymeric dispersants it is advantageous to use an organic solvent, especially a water-miscible organic polar, protic or aprotic solvent, e.g. an alcohol or ketone.

The ratio by weight of the 1,4-diketo-3,6-diphenylpyrrolo[3,4-c]pyrrole compositions according to the invention relative to the ink is advantageously chosen in the range from 0.0001 to 75% by weight, especially from 0.001 to 50% by weight, based on the total weight of the ink.

The present invention accordingly relates also to a process for the preparation of inks, which comprises blending together high molecular weight organic material and a tinctorially effecttive amount of the 1,4-diketo-3,6-diphenylpyrrolo[3,4-c]pyrrole composition according to the invention.

The present invention relates also to colorants, especially paints, comprising a high molecular weight organic material and/or water-dilutable binder system and a tinctorially effective amount of a 1,4-diketo-3,6-diphenylpyrrolo[3,4-c]pyrrole composition according to the invention.

The present invention relates also to a process for the preparation of colorants, especially paints, comprising a high molecular weight organic material and/or water-dilutable binder system and a tinctorially effective amount of a 1,4-diketo-3,6-diphenylpyrrolo[3,4-c]pyrrole composition according to the invention.

The present invention relates also to coloured plastics or polymeric colour particles comprising high molecular weight organic material and a tinctorially effective amount of a 1,4-diketo-3,6-diphenylpyrrolo[3,4-c]pyrrole composition according to the invention.

The present invention relates also to a process for the production of coloured plastics or polymeric colour particles, especially for the production of mass-coloured plastics, which comprises mixing together a high molecular weight organic material and a tinctorially effective amount of a composition according to the invention.

The colouring of high molecular weight organic substances using the 1,4-diketo-3,6-diphenylpyrrolo[3,4-c]pyrrole compositions according to the invention is effected, for example, by admixing such a colorant, optionally in the form of a masterbatch, with such substrates using roll mills or mixing or grinding apparatuses, with the result that the colorant is dissolved or finely dispersed in the high molecular weight material. The composition according to the invention can generally be mixed and/or extruded with plastics granules or powder. If desired, the mixture can be processed in the extruder to form fibres, films or granules.

The high molecular weight organic material with the admixed colorant is then processed according to methods known per se, for example calendering, compression moulding, extrusion, coating, spinning, casting or injection moulding, whereby the coloured material acquires its final shape. Admixture of the colorant can also be effected immediately prior to the actual processing step, for example by continuously feeding a pulverulent colorant according to the invention and, at the same time, a granulated high molecular weight organic material, and optionally also additional ingredients, directly into the intake zone of an extruder, where mixing takes place immediately before processing. Generally, however, it is preferable to mix the colorant into the high molecular weight organic material beforehand, since more uniform results can be achieved.

A further variant of the present invention therefore relates to a process for the preparation of plastics, preferably mass-coloured plastics, more especially partially crystalline plastics, by moulding the 1,4-diketo-3,6-diphenylpyrrolo[3,4-c]pyrrole compositions according to the invention with the plastics in an injection-moulding process.

The constituents of the injection-moulding formulation may be premixed before being fed into the injection-moulding machine, or they may alternatively be fed in individually at the same time. It is also possible to premix two or more components, and if desired also additives, and then to feed the mixture into the injection-moulding machine together with other components, which may be used individually or may likewise be premixed.

In a special variant of the process according to the invention, the process is carried out in masterbatches.

The concentration of the 1,4-diketo-3,6-diphenylpyrrolo[3,4-c]pyrrole composition according to the invention in the masterbatch is preferably from 5 to 70% by weight, based on the total weight of the composition according to the invention and the plastics.

In order to produce non-rigid mouldings or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the process according to the invention, the plasticisers can be incorporated into the polymers before or after the incorporation of the colorant. It is also possible, in order to achieve different colour shades, to add to the high molecular weight organic materials, in addition to the 1,4-diketo-3,6-diphenylpyrrolo[3,4-c]pyrrole compositions according to the invention, constituents such as white, coloured or black pigments, in any desired amounts.

For the colouring of surface-coatings and printing inks, the high molecular weight organic materials and the 1,4-diketo-3,6-diphenylpyrrolo[3,4-c]pyrrole compositions according to the invention are finely dispersed or dissolved, optionally together with additives, such as fillers, dyes, pigments, siccatives or plasticisers, in a common organic solvent or solvent mixture. It is also possible to use a procedure in which the individual components are dispersed or dissolved separately or in which a plurality thereof are dispersed or dissolved together, and only then all of the components combined. The processing is effected according to customary methods, for example by spraying, film-coating or one of the many printing methods, the surface-coating or the printing ink advantageously being cured thermally or by irradiation, where appropriate after drying beforehand.

When the high molecular weight material to be coloured is a surface-coating, it may be a customary surface-coating or a specialist surface-coating, for example an automotive finish, preferably a metallic paint containing e.g. metal or mica particles.

Preference is given to the colouring of thermoplastic plastics, especially in the form of fibres, as well as printing inks. Preferred high molecular weight organic materials that can be coloured in accordance with the invention are generally polymers having a dielectric constant $\geq 2.5$, especially polyesters, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Especially preferred are polyesters, polypropylene, polycarbonate, polystyrene and PMMA and mixtures thereof. More especially preferred are polyesters, polycarbonate and PMMA, especially aromatic polyesters, which can be obtained by polycondensation of terephthalic acid, for example polyethylene terephthalate (PET) or polybutylene terephthalate (PBTP) and polypropylene.

Special preference is given also to the colouring of low molecular weight organic materials, such as mineral oils, lubricating greases and waxes, using the compounds according to the invention.

The present invention relates also to non-impact-printing material comprising high molecular weight organic material and a tinctorially effective amount of a composition according to the invention.

The present invention relates also to a process for the preparation of non-impact-printing material, which comprises blending together a high molecular weight organic material and a tinctorially effective amount of a composition according to the invention.

The present invention relates also to a toner comprising high molecular weight organic material and a tinctorially effective amount of a 1,4-diketo-3,6-diphenylpyrrolo[3,4-c]pyrrole composition according to the invention.

The present invention relates also to a process for the preparation of toners, which comprises blending together a high molecular weight organic material and a tinctorially effective amount of a 1,4-diketo-3,6-diphenylpyrrolo[3,4-c]pyrrole composition according to the invention.

In a special embodiment of the process according to the invention, toners, paints, inks or coloured plastics are prepared by processing masterbatches of toners, paints, inks or coloured plastics in roll mills or mixing or grinding apparatuses.

In the present invention, "a tinctorially effective amount" of the 1,4-diketo-3,6-diphenylpyrrolo[3,4-c]pyrrole composition according to the invention generally denotes from 0.0001 to 99.99% by weight, especially from 0.001 to 50% by weight and more especially from 0.01 to 50% by weight, based on the total weight of the material pigmented or coloured therewith.

In the present invention it has been possible to prepare pigments for water-based coating materials that do not contain sulfo groups. Such pigments exhibit excellent application-related properties and fastness properties, and dyeings made therewith have especially very good fastness to overspraying and to weathering as well as high transparency and low fluorescence, and they are therefore outstandingly suitable for use in the automotive industry.

Furthermore, novel ternary 1,4-diketo-3,6-diphenylpyrrolo[3,4-c]pyrrole compositions have been found that, for example, in thermoplastic or thermosetting plastics, especially polypropylene, and also fibres, paints, printing inks and in laminate printing, are distinguished by a pure colour shade, high colour strength, high saturation and fine particle size and also by high transparency, good fastness to overspraying, to migration, to rubbing, to light and to weathering, and by good gloss and low fluorescence. Especially advantageously, the use of the 1,4-diketo-3,6-diphenylpyrrolo[3,4-c]pyrrole compositions according to the invention enables very weather-resistant, transparent and tinctorially strong dyeings of high molecular weight or low molecular weight materials to be obtained.

EXAMPLE 1

Dyeings in PVC 65 g of stabilised polyvinyl chloride, 35 g of dioctyl phthalate and 1 g of pigment composition from one of Examples 1 a–I below are mixed together and then rolled in accordance with the following three steps at a rolling temperature of 165° C. (each roller) in a 2-roll mill (Model Collin, D-85560 Ebersberg):
a) hot rolling: 8 min (rolled film turned after every minute) roller gap: 0.4 mm
b) rolling at increased shearing forces: 20 passes at 75° C.
c) hot rolling: 3 min roller gap: 0.4 mm.

The resulting press films, dyeings in PVC, are measured to determine the hue angle h and the transparency using a Datacolor 3890® spectrophotometer (d/8 geometry, influenced by the gloss, light type D65, observer 10°) in accordance with DIN 53234.

EXAMPLE 1A

A mixture of 23.0 g (1.0 mol) of sodium and 400 ml of tert-amyl alcohol is heated overnight at 110–115° C. under reflux. 44.8 g (0.25 mol) of 4-biphenylnitrile and 34.4 g (0.25 mol) of 3-chlorobenzonitrile are then added to the resulting clear solution. The reaction mixture is stirred at 105–110° C., 67.1 ml (0.325 mol) of succinic acid diisopropyl ester being added dropwise over a period of 4 hours. When the addition is complete, the resulting dark-red suspension is maintained at 110–105° C. for a further two hours and then cooled to 50° C. The resulting reaction mixture is added over a period of 30 min to a mixture of 400 ml of water and 400 ml of methanol and stirred under reflux (78° C.) for 6 hours. The pigment composition so obtained is filtered off and washed with methanol and water. Drying overnight in vacuo at 80° C. yields 70.6 g (71% of theory) of a dark-red powder which in PVC results in a transparent red dyeing.

EXAMPLE 1B

Same procedure as that described in Example 1a, but 26.9 g (0.15 mol) of 4-bi-phenylnitrile and 48.2 g (0.35 mol) of 3-chlorobenzonitrile are reacted, yielding 72.6 g (76% of theory) of a red powder which in PVC results in a transparent orange-red dyeing.

EXAMPLE 1C

A mixture of 32.2 g (1.4 mol) of sodium and 435 ml of tert-amyl alcohol is heated overnight at 110–115° C. under reflux. The resulting clear solution is stirred at 105° C. and a mixture of 48.1 g (0.35 mol) of 4-chlorobenzonitrile, 60.2 g (0.35 mol) of 3,4-dichlorobenzonitrile and 95 ml (0.46 mol) of succinic acid diisopropyl ester dissolved in 175 ml of tert-amyl alcohol is added dropwise over a period of 2.5 hours, the temperature gradually being lowered to 90° C. and the isopropanol that forms being distilled off together with a small amount of tert-amyl alcohol. When the addition is complete, the resulting suspension is maintained at 110–105° C. for a further two hours and then cooled to 50° C. The resulting reaction mixture is added over a period of 45 min to a mixture of 900 ml of water, 900 ml of methanol and 107 g (1.75 mol) of acetic acid and stirred overnight at room temperature. The pigment so obtained is filtered off and washed with methanol and water. Drying overnight in vacuo at 80° C. yields 115.6 g (84% of theory) of a red powder which in PVC results in a transparent orange dyeing.

EXAMPLE 1D

Same procedure as that described in Example 1c, but 67.3 g (0.49 mol) of 4-chlorobenzonitrile and 36.1 g (0.21 mol) of 3,4-dichlorobenzonitrile are reacted, yielding 113.1 g (86% of theory) of a red powder which in PVC results in a transparent orange dyeing.

EXAMPLE 1E

A mixture of 18.4 g (0.8 mol) of sodium and 250 ml of tert-amyl alcohol is heated overnight at 110–115° C. under reflux. The resulting clear solution is stirred at 105° C. and a mixture of 38.5 g (0.28 mol) of 3-chlorobenzonitrile, 16.5 g (0.12 mol) of 4-chlorobenzonitrile and 53.7 ml (0.26 mol) of succinic acid diisopropyl ester dissolved in 100 ml of tert-amyl alcohol is added dropwise over a period of 3 hours, the temperature gradually being lowered to 85° C. and the isopropanol that forms being distilled off together with a small amount of tert-amyl alcohol. When the addition is complete, the resulting dark-red suspension is maintained at 85° C. for a further one hour and then cooled to room temperature. The resulting reaction mixture is added over a period of 30 min to a mixture of 500 ml of water, 500 ml of methanol and 51 g (0.5 mol) of conc. sulfuric acid and stirred overnight at 40° C. The pigment composition so obtained is filtered off and washed with methanol and water. Drying overnight in vacuo at 80° C. yields 59.8 g (84% of theory) of a red powder which in PVC results in a transparent orange dyeing.

EXAMPLE 1F

Same procedure as that described in Example 1e, but 16.5 g (0.12 mol) of 3-chlorobenzonitrile and 38.5 g (0.281 mol) of 4-chlorobenzonitrile are reacted, yielding 60.8 g (85% of theory) of a red powder which in PVC results in a transparent orange dyeing.

EXAMPLE 1G

A mixture of 9.2 g (0.4 mol) of sodium and 90 ml of tert-amyl alcohol is heated overnight at 110–115° C. under reflux. 7.0 g (0.06 mol) of 4-tolunitrile and 19.3 g (0.14 mol) o 4-chlorobenzonitrile are then added to the resulting clear solution. The reaction mixture is stirred at 105° C., 26.8 ml (0.13 mol) of succinic acid diisopropyl ester being added dropwise over a period of 2 hours. At the same time the temperature is gradually lowered to 90°C and the isopropanol that forms is distilled off together with a small amount of tert-amyl alcohol. When the addition is complete, the resulting dark-red suspension is maintained at 105° C. for a further two hours and then cooled to room temperature. The resulting reaction mixture is added over a period of 15 min to a mixture of 250 ml of water, 250 ml of methanol and 25.5 g (0.25 mol) of conc. sulfuric acid and stirred overnight at 40° C. The pigment composition so obtained is filtered off and washed with methanol and water. Drying overnight in vacuo at 80° C. yields 25.0 g (74% of theory) of a dark-red powder which in PVC results in a transparent red dyeing.

EXAMPLE 1H 65 g of stabilised polyvinyl chloride, 35 g of dioctyl phthalate and 0.2 g of pigment composition from Example 1i or from U.S. Pat. No. 4,579,949, Example 37, and U.S. Pat. No. 4,490,542, Example 26, are mixed together. The resulting mixture is then rolled in accordance with the following three steps at a rolling temperature of 165° C. (each roller) in a 2-roller mill (Model Collin, D-85560 Ebersberg):

a) hot rolling: 8 min (rolled film turned after every minute)
  roller gap: 0.4 mm
b) rolling at increased shearing forces: 20 passes at 75° C.
c) hot rolling: 3 min
  roller gap: 0.4 mm.

The resulting PVC press films, dyeings in PVC, are compared in respect of their transparency.

For determining the difference in transparency, the pigment composition from U.S. Pat. No. 4,490,542, Example 26, is used as standard reference. The difference in transparency is determined relative to the standard reference (using a Datacolor 3890® spectrophotometer (d/8 geometry, influenced by the gloss, light type D65, observer 100), measured according to DIN 53234.

|  | Difference in transparency compared with U.S. Pat. No. 4 490 542, Example 26: ΔTr |
|---|---|
| U.S. Pat. No. 4 490 542, (Example 26) | Reference |
| U.S. Pat. No. 4 579 949, (Example 37) | −1.0 (more opaque) |
| Example 1i | 7.9 (more transparent) |

The comparison tests carried out on the ternary 1,4-diketopyrrolo[3,4-c]pyrrole composition from Example 1g in comparison with the ternary 1,4-diketopyrrolo[3,4-c]pyrrole composition from U.S. Pat. No. 4,579,949, Example 37, which has an identical chemical structure, and in comparison with the binary 1,4-diketo-3,6-diphenylpyrrolo[3,4-c]pyrrole composition from U.S. Pat. No. 4,490,542, Example 26, which is prepared from equimolar amounts of 4-chlorobenzonitrile and 4-methylbenzonitrile by reaction with a lactam (4-ethoxycarbonyl-5-phenyl-4-pyrrolin-2-one), show that the ternary 1,4-diketopyrrolo[3,4-c]pyrrole composition according to the invention from Example 1g, in contrast to the known pigment compositions, produces a much more transparent dyeing in PVC.

EXAMPLE 1I

Same procedure as that described in Example 1g, but 11.7 g (0.1 mol) of 4-tolunitrile and 13.75 g (0.1 mol) of 4-chlorobenzonitrile are reacted, yielding 22.2 g (66% of theory) of a red powder which in PVC results in a transparent red dyeing.

EXAMPLE 1J

A mixture of 9.2 g (0.4 mol) of sodium and 125 ml of tert-amyl alcohol is heated overnight at 110–115° C. under reflux. The resulting clear solution is cooled to 105° C. and a mixture of 17.2 g (0.10 mol) of 3,4-dichlorobenzonitrile, 17.9 g (0.10 mol) of 4-biphenylnitrile and 26.8 ml (0.13 mol) of succinic acid diisopropyl ester dissolved in 50 ml of tert-amyl alcohol is added dropwise thereto over a period of 3 hours. At the same time the temperature is gradually lowered to 85° C. and the isopropanol that forms is distilled off together with a small amount of tert-amyl alcohol. When the addition is complete, the resulting dark-red suspension is diluted with 20 ml of tert-amyl alcohol and cooled to 50° C. The resulting reaction mixture is added over a period of 15 min to a mixture of 200 ml of water and 200 ml of methanol and stirred overnight at reflux (78° C.). The pigment composition so obtained is filtered off and washed with methanol and water. Drying overnight in vacuo at 80° C. yields 30.0 g (69% of theory) of a red powder which in PVC results in a transparent red dyeing.

EXAMPLE 1K

A mixture of 9.2 g (0.4 mol) of sodium and 90 ml of tert-amyl alcohol is heated overnight at 110–115° C. under reflux. The resulting clear solution is stirred at 105° C. and 11.7 g (0.1 mol) of 4-tolunitrile are added. Then a mixture of 17.2 g (0.1 mol) of 3,4-dichlorobenzonitrile and 26.8 ml (0.13 mol) of succinic acid disopropyl ester is dissolved in 50 ml of tert-amyl alcohol and added dropwise over a period of 2 hours. At the same time the temperature is gradually lowered to 95° C. and the isopropanol that forms is distilled off together with a small amount of tert-amyl alcohol. When the addition is complete, the resulting dark-red suspension is stirred for a further one hour at 95° C. and then cooled to 30° C. The resulting reaction mixture is added over a period of 15 min to a mixture of 250 ml of water and 250 ml of methanol and stirred at 40° C. for 8 hours. The pigment composition so obtained is filtered off and washed with methanol and water. Drying overnight in vacuo at 80° C. yields 27.1 g (73% of theory) of a red powder which in PVC results in a transparent orange dyeing.

EXAMPLE 1L

Same procedure as that described in Example 1k, but 3-tolunitrile is used instead of 4-tolunitrile. When the addition is complete, the resulting dark-red suspension is stirred for a further one hour at 95° C. and then cooled to 30° C. The resulting reaction mixture is added over a period of 15 min to a mixture of 250 ml of water and 250 ml of methanol and stirred for 8 hours at reflux (78° C.). The pigment composition so obtained is filtered off and washed with methanol and water. Drying overnight in vacuo at 80° C. yields 23.4 g (63% of theory) of a red powder which in PVC results in a transparent orange dyeing.

EXAMPLE 1M

A mixture of 51.7 g (2.25 mol) of sodium and 500 ml of tert-amyl alcohol is heated overnight at 110–115° C. under reflux. The resulting clear solution is cooled to 105° C. and a mixture, which has been preheated to 70° C., of 86.0 g (0.5 mol) of 3,4-dichlorobenzonitrile, 58.6 g (0.5 mol) of 4-tolunitrile and 123.9 ml (0.6 mol) of succinic acid diisopropyl ester dissolved in 300 ml of tert-amyl alcohol is added dropwise thereto over a period of 3 hours. Then a further 20.7 ml (0.1 mol) of succinic acid diisopropyl ester are added dropwise at 105° C. over a period of 2 hours. When the addition is complete, the resulting dark-red suspension is cooled to room temperature. The reaction mixture is then added to a mixture of 2250 ml of water and 450 ml of methanol, the temperature not rising above 30° C., and then stirred at 60° C. for 4 hours. The pigment composition so obtained is filtered off and washed with methanol and water. Drying overnight in vacuo at 80° C. yields 125.1 g (67% of theory) of an orange-red powder which in PVC results in a transparent orange dyeing.

EXAMPLE 1N

A mixture of 10.4 g (0.45 mol) of sodium and 100 ml of tert-amyl alcohol is heated overnight at 110–115° C. under reflux. The resulting clear solution is cooled to 110° C. and a mixture, which has been preheated to 70° C., of 19.3 g (0.14 mol) of 4-chlorobenzonitrile, 7.0 g (0.06 mol) of 4-tolunitrile, 1.0 g (0.008 mol) of isophthalic acid dinitrile and 24.8 ml (0.12 mol) of succinic acid diisopropyl ester dissolved in 300 ml of tert-amyl alcohol is added dropwise thereto over a period of 3 hours. At the same time the reaction temperature is reduced to 100° C. A further 4.1 ml (0.02 mol) of succinic acid diisopropyl ester are then added dropwise at 100° C. over a period of 2 hours. When the addition is complete, the resulting dark-red suspension is cooled to room temperature. The reaction mixture is then added to a mixture of 500 ml of water and 100 ml of methanol, the temperature not rising above 30° C., and then stirred overnight at room temperature. The pigment composition so obtained is filtered off and washed with methanol and water. Drying overnight in vacuo at 80° C. yields 28.6 g (83% of theory) of a red powder which in PVC results in a transparent red dyeing.

EXAMPLE 1O

A mixture of 10.4 g (0.45 mol) of sodium and 100 ml of tert-amyl alcohol is heated overnight at 110–115° C. under reflux. The resulting clear solution is cooled to 105° C. and a mixture, which has been preheated to 70° C., of 24.1 g (0.14 mol) of 3,4-dichlorobenzonitrile, 10.7 g (0.06 mol) of 4-tolunitrile and 24.78 ml (0.12 mol) of succinic acid diisopropyl ester dissolved in 60 ml of tert-amyl alcohol is added dropwise over a period of 3 hours. A further 4.1 ml (0.02 mol) of succinic acid diisopropyl ester are then added dropwise at 105° C. over a period of 2 hours. When the addition is complete, the resulting dark-red suspension is cooled to room temperature. The reaction mixture is then added to a mixture of 500 ml of water and 100 ml of methanol, the temperature not rising above 3000, and then stirred for 4 hours under reflux (83° C.). The pigment composition so obtained is filtered off and washed with methanol and water. Drying overnight in vacuo at 100° C. yields 34.1 g (79% of theory) of an orange-red powder which in PVC results in a transparent orange dyeing.

EXAMPLE 1P

A mixture of 10.4 g (0.45 mol) of sodium and 100 ml of tert-amyl alcohol is heated overnight at 110–115° C. under reflux. The resulting clear solution is cooled to 105° C. and a mixture, which has been preheated to 70° C., of 19.3 g (0.14 mol) of 4-chlorobenzonitrile, 10.3 g (0.06 mol) of 3-trifluoromethylbenzonitrile and 24.8 ml (0.12 mol) of succinic acid diisopropyl ester dissolved in 60 ml of tert-amyl alcohol is added dropwise thereto over a period of 3 hours, the reaction temperature at the same time being reduced to 85° C. Then a further 4.1 ml (0.02 mol) of succinic acid diisopropyl ester are added dropwise at 85° C. over a period of 1 hour. When the addition is complete, the resulting red suspension is cooled to room temperature. The reaction mixture is then added to a mixture of 500 ml of water and 100 ml of methanol, the temperature not rising above 35° C., and then stirred for 4½ hours at 40° C. The pigment composition so obtained is filtered off and washed with methanol and water. Drying overnight in vacuo at 100° C. yields 32.7 g (87% of theory) of an orange-red powder which in PVC results in a transparent yellowish orange dyeing.

EXAMPLE 2

Process for the preparation of a composition comprising water-based coating materials and a 1,4-diketopyrrolo[3,4-c]pyrrole composition comprising compounds of formulae (I), (II), (III):

EXAMPLE 2A

Preparation of a Millbase

A mixture of a 1,4-diketopyrrolo[3,4-c]pyrrole composition, 15 g, prepared according to one of Examples 1a-I, a grinding medium, 46 g, prepared according to U.S. Pat. No. 4,891,401 (Example 1), and an antifoam, 0.4 g, (®Foamaster TCX from Henkel), in deionised water, 23 g, is dispersed in a shaker (Skandex) with zirconium spheres of 1–1.6 mm diameter, 310 g, for about 240 minutes (dispersion monitoring by microscope). Then latex, 15.6 g, prepared according to EP 38 127 (Example 3A), is added to the dispersion and mixing is carried out in the Skandex for 15 minutes (total 100 g, pigment concentration in the millbase=15%).

EXAMPLE 2B

Preparation of the Masstone Coating (Let Down)

The millbase, 30.0 g, prepared according to Example 2a, is mixed together with a let-down medium, 59.1 g, prepared according to EP 38 127 (Example 3B, but unlike Example 3B here without aluminium paste) and a 2% strength thickener (®Viscalex HV30 from Ciba SC), 0.90 g, in the Skandex for 2 minutes. 90 g of a masstone coating containing 3.33% by weight pigment are obtained.

EXAMPLE 2C

Preparation of Two-Layer Metallic Paints

For the preparation of a basecoat, a masstone coating, 30.27 g, prepared according to Example 2b, is mixed with an aluminium stock solution, 19.73 g, consisting of 5.133 parts of a conventional 65% strength aluminium paste and 15.193 parts of 2-butoxyethanol and applied by spraying to an aluminium sheet (wet film about 20 µm). After a flash-off period of 30 minutes at room temperature, there is applied by spraying, as clearcoat, a thermosetting acrylic varnish consisting of 29.6 g of acrylic resin, ®URACRON 2263XB, 50% strength in xylene/butanol (Chem. Fabrik Schweizerhalle), 5.8 g of melamine resin ®CYMEL 327, 90% strength in isobutanol, 2.75 g of butyl glycol acetate, 5.70 g of xylene, 1.65 g of n-butanol, 0.50 g of silicone oil (1% strength in xylene), 3.00 g of light stabiliser ®TINUVIN 900, 10% strength in xylene (Ciba SC), 1.00 g of light stabiliser ®TINUVIN 292, 10% strength in xylene (Ciba SC) (wet film about 50 µm). The coating is then flashed-off for a further 30 minutes at room temperature and then baked for 30 minutes at 130° C. A metallic paint oversprayed with a clearcoat is obtained, the ratio by weight of coloured pigment to aluminium pigment in the basecoat being 65:35.

EXAMPLE 2D

Preparation of a Water-Based Whitecoat

A mixture of titanium dioxide, 18 g, a grinding medium, 46 g, prepared according to U.S. Pat. No. 4,891,401 (Example 1), and an antifoam, 0.4 g, (@Foamaster TCX from Henkel), in deionised water, 20 g, is dispersed in a shaker (Skandex) with zirconium spheres of 1–1.6 mm diameter, 310 g, for about 240 minutes (dispersion monitoring by microscope). Then latex, 15.6 g, prepared according to EP 38 127 (Example 3A), is added to the dispersion and mixing is carried out in the Skandex for 15 minutes.

EXAMPLE 3A

Testing Fastness to Overspraying

The masstone coating, prepared according to Example 2b, containing 5% by weight of the ternary 1,4-diketopyrrolo[3,4-c]pyrrole composition from one of Examples 1a-k, is applied using a spray gun to % of the surface of an aluminium sheet (dry film thickness about 40 µm) and flashed-off for 30 minutes at room temperature and then baked for a further 30 minutes at 130° C. 3/4 of the resulting baked layer (basecoat) and ¾ of the previously uncoated surface of the aluminium sheet are sprayed, again using a spray gun, with the whitecoat prepared according to Example 2d to'give an opaque covering (dry film thickness >100 µm) and flashed-off for 30 minutes at room temperature and then baked for a further 30 minutes at 130° C. Finally, a clearcoat of a commercially available solvent-based thermosetting acrylic varnish is applied, using a spray gun, to half of the whitecoat-treated surface of the aluminium sheet (dry film thickness about 40 µm), flashed-off for 30 minutes at room temperature and then baked for a further 30 minutes at 130° C., yielding dry paint film samples having inter alia zones coated with coloured coat/whitecoat/clearcoat (test layer) and zones coated only with whitecoat/clearcoat (reference layer).

To determine the fastness to overspraying, the test layer is measured colorimetrically against the reference layer and the colour deviation is given in ΔE according to CIELAB units.

The colour measurements are carried out using a Minolta CM-508i® spectrophotometer (d/8 geometry, influenced by the gloss, light type D65, observer 10°).

EXAMPLE 3B

Testing Fastness to Weathering

The two-layer metallic paint, prepared according to Example 2c, containing 2.5% by weight of the ternary 1,4-diketopyrrolo[3,4-c]pyrrole composition from one of Examples 1 a–k, is applied using a spray gun or automatic spraying device to the surface of an aluminium sheet (dry film thickness about 20 µm) and flashed-off for 20 minutes at room temperature. While the resulting metallic paint (basecoat) is still wet, there is then applied thereto, using a spray gun or automatic spraying device, a clearcoat of a commercially available solvent-based thermosetting acrylic varnish (dry film thickness about 40 µm) and the coating is then flashed-off for 30 minutes at room temperature and then baked for a further 30 minutes at 130° C.

The coated sheets are subjected to accelerated weathering conditions in an Atlas Weather-O-Meter (4000 hours, Xe 6500W, cycle 7: 102 minutes light —18 minutes light and spraying with deionised water).

To determine the fastness to weathering, the weathered sample is then measured colorimetrically against an unweathered reference sample and the colour deviation is given in ΔE according to CIELAB units.

The colour measurements are carried out using a Minolta CM-508i® spectrophotometer (d/8 geometry, influenced by the gloss, light type D65, observer 10°).

| Pigment composition comprising pigment prepared according to | Fastness to overspraying according to Example 3a in ΔE | Fastness to weathering after 4000 hours according to Example 3b in ΔE |
| --- | --- | --- |
| Example 1a | 1.6 | 2.0 |
| Example 1b | 0.8 | 3.9 |
| Example 1c | 2.6 | 1.9 |
| Example 1e | 2.7 | 1.3 |
| Example 1g | 3.0 | 1.3 |
| Example 1i | 3.3 | 2.0 |
| Example 1j | 1.7 | 1.8 |
| Example 1k | 2.8 | 1.7 |
| Example 1l | 5.3 | 3.4 |

EXAMPLE 4A

Preparation of a Finished Masstone Coating

A mixture of a 1,4-diketopyrrolo[3,4-c]pyrrole composition, 10 g, prepared according to one of Examples 1a–k, 66.65 g of Setal 6407 SQ-26 (AKZO NOBEL, water-dilutable saturated polyester polyol with 2.7% OH), 67.92 g of Setalux 6802 AQ-24 (AKZO NOBEL, Acrylic Copolymer Dispersion), 6.65 g of Setamin MS 155 AQ-80 (AKZO NOBEL, water-dilutable melamine resin), 0.25 g of Drewplus T-4500 (Drew Ameroid Deutschland, antifoam), 0.58 g of Disperbyk 184 (Byk Chemie, water-dilutable wetting and dispersing additive), 41.95 g of deionised water, 5.8 g of butyl glycol and 0.20 g of DMEA 100% (2-dimethyl-aminoethanol) is dispersed together with 400 g of glass beads of 2 mm diameter using a high-speed mixer (Dispermat CV) at 3000 rev/min for 6 hours, yielding 200 g of a finished masstone coating containing 5% by weight of a 1,4-diketopyrrolo[3,4-c]pyrrole composition according to one of Examples 1a–l.

EXAMPLE 4B

Preparation of the Metallic Paint

Preparation of an aluminium stock solution:
37.50 g of STAPA Hydrolac WHH 8154 (Eckart, Alu-Paste), 33 g of butyl glycol, 31.50 g of Setal 6306 SS-60 (AKZO NOBEL, water-dilutable saturated polyester polyol with 2.7% OH) and 1 g of DMEA 100% are stirred for 1 hour at 800 rev/min using a vaned stirring device. 103.00 g of a mixture containing 24% by weight aluminium are obtained. 25.75 g of that mixture are mixed with 120 g of Setalux 6802 AQ-24 (AKZO NOBEL), 11.75 g of Setamin MS 155 AQ-80 (AKZO NOBEL), 16.00 g of Setal 6407 SQ-26 (AKZO NOBEL), 10.25 g of butyl glycol, 68.75 g of deionised water and 2.50 g of dimethylethylamine, DMEA, 10% and stirred for 1 hour at 800 rev/min using a vaned stirring device. 255.00 g of a mixture containing 2.4% by weight aluminium are obtained.

Then a mixture of 16.22 g of the finished masstone coating, prepared according to Example 4a, is stirred with 33.78 g of the aluminium stock solution (2.4% aluminium) for 1 hour at 800 rev/min using a vaned stirring device.

The mixture is applied by spraying to an aluminium sheet (wet film about 20 mm). After a flash-off period of 30 minutes at room temperature, there is applied by spraying, as clearcoat, a thermosetting acrylic varnish consisting of 29.6 g of acrylic resin ®URACRON 2263XB (DSM), 50% strength in xylene/butanol (Chem. Fabrik Schweizerhalle), 5.8 g of melamine resin ®CYMEL 327 (Dyno-Cytek), 90% strength in isobutanol, 2.75 g of butyl glycol acetate, 5.70 g of xylene, 1.65 g of n-butanol, 0.50 g of silicone oil (1% strength in xylene), 3.00 g of light stabiliser TINUVIN 900, 10% strength in xylene (Ciba SC), 1 g of light stabiliser ®TINUVIN 292, 10% strength in xylene (Ciba SC) (wet film about 50 µm). After a further 30 minutes, the coating is flashed-off at room temperature and then baked for 30 minutes at 130° C., yielding a basecoat oversprayed with a clearcoat, the ratio by weight of coloured pigment, 1,4-diketopyrrolo[3,4-c]pyrrole composition according to one of Examples 1a–k, to aluminium pigment in the basecoat being 50:50.

EXAMPLE 4C

Preparation of a Whitecoat

A mixture of 80 g of white pigment, $TiO_2$ Kronos 2310, 129.34 g of Setal 6407 SQ-26 (AKZO NOBEL), 131.72 g of Setalux 6802 AQ-24 (AKZO NOBEL), 31.90 g of Setamin MS 155 AQ-80 (AKZO NOBEL), 2.00 g of Viskalex HV 30 (thickener), 0.20 g of Drewplus T-4500 (Drew Ameroid Deutschland), 21.71 g of deionised water, 2.98 g of butyl glycol and 0.15 g of DMEA is dispersed together with 800 g of steatite spheres of 8 mm diameter on a roller rack for 48 hours at 90 rev/min.

400 g of the finished masstone coating containing 20% by weight white pigment are obtained.

EXAMPLE 4D

Preparation of an Intaglio/Flexographic Printing Ink 15.0 g of the pigment from Example 1a,
20.0 g of a clear lacquer consisting of
  20.0 g of nitrocellulose type A,
  4.0 g of dioctyl phthalate,
  56.0 g of ethyl alcohol and
  20.0 g of ethyl acetate
and
  25.0 g of ethyl alcohol
are dispersed for 30 minutes using a high-speed stirring device (disperser at 15 m/sec). The batch is then supplemented with 40.0 g of the clear lacquer described above and dispersed using the disperser for a further 5 minutes. The resulting mill batch is introduced by means of a pump having coarse filtering into a pearl mill and finely dispersed therein. The finished printing ink results in extraordinary transparency/gloss properties both in intaglio/flexographic printing and in offset printing.

EXAMPLE 4E 400.0 g of polypropylene granules (®DAPLEN PT-55, Chemie LINZ) and 4.9 g of the pigment obtained according to Example 1a are mixed intensively in a mixing drum.

The granules so treated are spun at from 260 to 285° C. in accordance with a melt-spinning process, yielding yellowish red transparent coloured fibres having very good textile properties, especially fastness to light and to wetting.

EXAMPLE 5

Testing Stability to Overspraying

The finished masstone coating, prepared according to Example 4a, is applied using a spray gun to ¾ of the surface of a glass plate (dry film thickness about 40 µm), flashed-off for 20 minutes at room temperature and then baked for a further 30 minutes at 100° C. ¾ of the resulting baked layer (basecoat) is sprayed, again using a spray gun, with the whitecoat prepared according to Example 4c to give an opaque covering (dry film thickness >100 µm) and then flashed-off for 20 minutes at room temperature and subsequently baked for a further 30 minutes at 120° C. A clearcoat of a commercially available solvent-based thermosetting acrylic varnish is applied, using a spray gun, to the surface of half of the whitecoat-treated glass plate (dry film thickness about 40 µm) and flashed-off for 30 minutes at room temperature and then baked for a further 30 minutes at 140° C., yielding dry paint film samples having inter alia zones coated with coloured coat/whitecoat/clearcoat (test layer) and zones coated only with whitecoat/clearcoat.

To determine the fastness to overspraying, the test layer is measured calorimetrically against the reference layer and the colour deviation is given in ΔE according to CIELAB units. The colour measurements are carried out using a Minolta CM-3006i® spectrophotometer (d/8 geometry, influenced by the gloss, light type D65, observer 10°).

EXAMPLE 6

Testing Fastness to Weathering

The metallic paint prepared according to Example 4b, containing 2.5% by weight of the ternary 1,4-diketopyrrolo[3,4-c]pyrrole composition from one of Examples 1a–k, is applied using a spray gun to the surface of an aluminium sheet (dry film thickness about 20 µm) and flashed-off for 20 minutes at room temperature. While the resulting basecoat is still wet, there is then applied thereto, using a spray gun, a clearcoat of a commercially available solvent-based thermosetting acrylic varnish (dry film thickness about 40 µm) and the coating is then flashed-off for 30 minutes at room temperature and then baked for a further 30 minutes at 130° C.

The coated sheets are subjected to accelerated weathering conditions in an Atlas Weather-O-Meter (4000 hours, Xe 6500W, cycle 7: 102 minutes light —18 minutes light and spraying with deionised water).

To determine the fastness to weathering, the weathered sample can be measured colorimetrically against an unweathered reference sample and the colour deviation given in ΔE according to CIELAB units.

| Pigment composition comprising pigment prepared according to | Fastness to overspraying according to Example 5 in ΔE | Fastness to weathering after 4000 hours according to Example 6 in ΔE |
|---|---|---|
| Example 1a | 0.6 | 0.1 |
| Example 1c | 0.9 | 1.1 |
| Example 1e | 0.9 | 0.5 |
| Example 1g | 1.2 | 1.2 |
| Example 1j | 0.9 | 2.1 |
| Example 1k | 0.6 | 1.6 |
| Example 1l | 2.1 | 2.7 |
| Example 1o | 0.3 | 1.0 |
| Example 1p | 2.6 | 1.9 |

What is claimed is:

1. A composition comprising water-based coating materials and a ternary 1,4-diketo-3,6-di-phenylpyrrolo[3,4-c]pyrrole composition comprising compounds of formulae (I), (II) and (III),

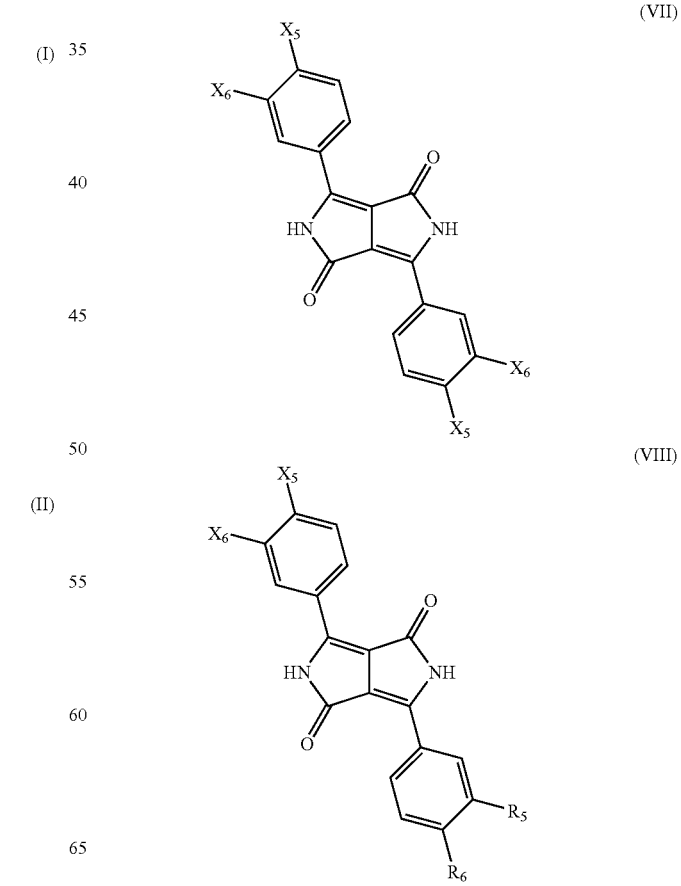

wherein
$X_1$ and $X_2$ are each independently of the other hydrogen or chlorine, with the proviso that $X_1$ and $X_2$ are not simultaneously hydrogen, and
$R_1$ and $R_2$ are each independently of the other hydrogen, $C_1$–$C_6$alkyl, chlorine, bromine, $C_1$–$C_6$perfluoroalkyl, $C_1$–$C_6$alkoxy or a phenyl radical unsubstituted or substituted by $C_1$–$C_6$alkyl, chlorine, bromine or by $C_1$–$C_6$alkoxy,
with the proviso that compounds of formulae (I), (II) and (III) are different.

2. A ternary 1,4-diketo-3,6-diphenylpyrrolo[3,4-c]pyrrole composition comprising compounds of formulae (VII), (VII) and (IX),

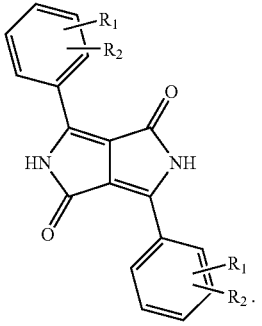

-continued

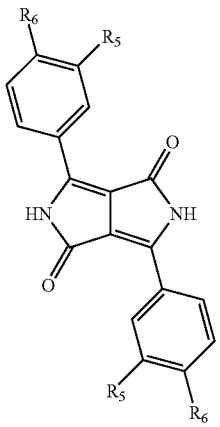

(IX)

wherein

X$_5$ is hydrogen and X$_6$ is chlorine, and

R$_5$ and R$_6$ are each independently of the other hydrogen, C$_1$–C$_6$alkyl, chlorine, bromine, C$_1$–C$_6$perfluoroalkyl, C$_1$–C$_6$alkoxy or a phenyl radical unsubstituted or substituted by C$_1$–C$_6$alkyl, chlorine, bromine or by C$_1$–C$_6$alkoxy, or X$_5$ and X$_6$ are chlorine, and R$_5$ and R$_6$ are each independently of the other hydrogen, C$_1$–C$_6$alkyl, chlorine, bromine, C$_1$–C$_6$perfluoroalkyl, C$_1$–C$_6$alkoxy or a phenyl radical unsubstituted or substituted by C$_1$–C$_6$alkyl, chlorine, bromine or by C$_1$–C$_6$alkoxy, with the proviso that when R$_6$ is chlorine, R$_5$ is not hydrogen, or X$_5$ is chlorine, and R$_5$ and X$_6$ are hydrogen, and R$_6$ is substituted or unsubstituted phenyl, with the proviso that compounds of formulae (VII), (VII) and (IX) are different.

3. A ternary 1,4-diketo-3,6-diphenylpyrrolo[3,4-c]pyrrole composition comprising compounds of formulae (VII), (VIII) and (IX),

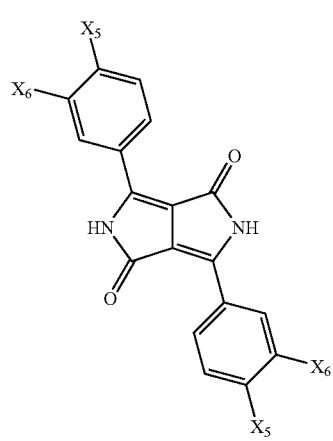

(VII)

-continued

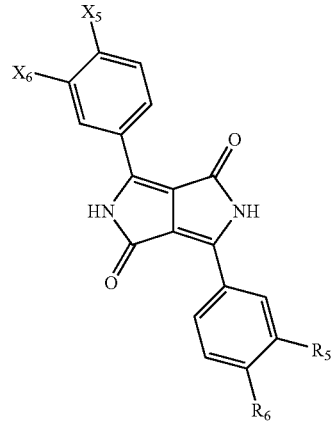

(VIII)

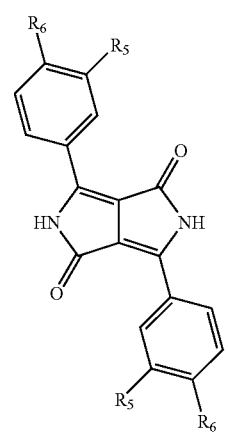

(IX)

wherein

X$_5$ and X$_6$ are chlorine,

R$_5$ is hydrogen and

R$_6$ is chlorine, which composition does not result in red dyeings.

4. A ternary 1,4-diketo-3,6-diphenylpyrrolo[3,4-c]pyrrole composition comprising compounds of formulae (VII), (VIII) and (IX),

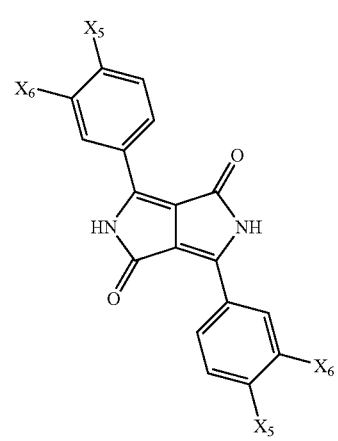

(VII)

-continued

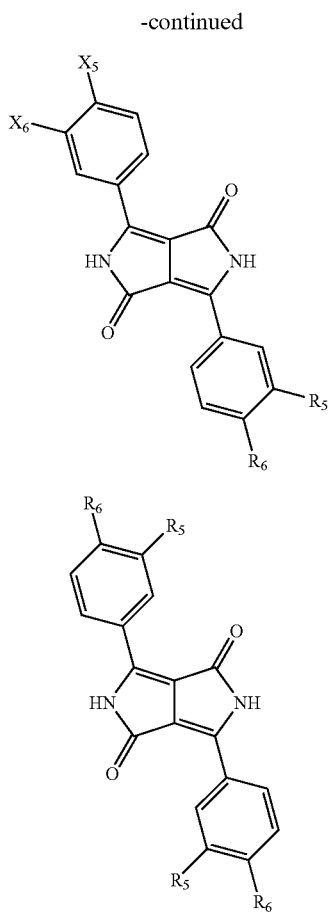

wherein

X$_5$ is chlorine and R$_6$ is methyl and

X$_6$ and R$_5$ are hydrogen, which composition-results in transparent dyeings.

5. A process for the preparation of a 1,4-diketo-3,6-diphenylpyrrolo[3,4-c]pyrrole composition of fomula (I), (II) and (III) defined in claim 1 by reaction of succinic acid diesters with two differently substituted benzonitriles in an organic solvent in the presence of a base at elevated temperature to form a pigment salt suspension and subsequent freeing of the ternary 1,4-diketo-3,6-diphenylpyrrolo[3,4-c]pyrrole composition, wherein a) two differently substituted benzonitriles of formulae (X) and (XI)

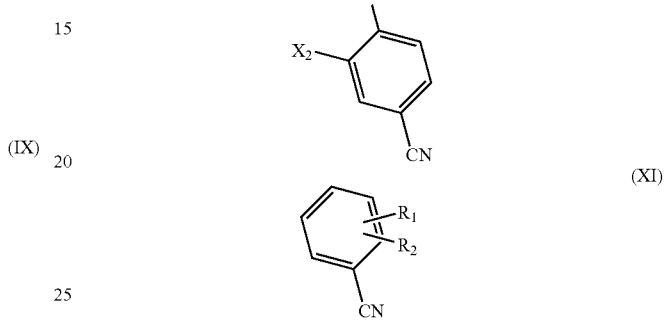

wherein

X$_1$, X$_2$, R$_1$ and R$_2$ are as defined in claim 1, are reacted in a molar ratio in the range of from 99.9 to 0.1 mol % of benzonitrile of formula (X) to from 0.1 to 99.9 mol % of benzonitrile of formula (XI) to form a pigment salt, and b) the pigment salt from process step a) is then protonated.

6. A process according to claim 5 for the preparation of a 1,4-diketo-3,6-diphenylpyrrolo[3,4-c]pyrrole composition of fomula (I), (II) and (III) defined in claim 1, wherein after the protonation according to claim 5, process step b), c) conditioning is carried out without acid.

* * * * *

UNITED STATES PATENT AND TRADEMARK OFFICE
CERTIFICATE OF CORRECTION

PATENT NO. : 7,081,540 B2
APPLICATION NO. : 10/475479
DATED : July 25, 2006
INVENTOR(S) : Roman Lenz et al.

It is certified that error appears in the above-identified patent and that said Letters Patent is hereby corrected as shown below:

In Column 5

Line 15 should read:

-- compounds of formulae (VII), (VIII) and (IX) --.

In Column 6

Line 13 should read:

-- that compounds of formulae (VII, (VIII) and (IX) are --.

Line 21 should read:

-- prising compounds of formulae (VII), (VIII) and (IX) --.

Line 28 should read:

-- pounds of formulae (VII), (VIII) and (IX) are different, or --.

Line 32 should read:

-- proviso that compounds of formulae (VII), (VIII) and (IX) --.

In column 11

Line 4 should read:

-- compounds of formulae (VII), (VIII) and (IX) wherein --.

In column 14

Line 21 should read:

-- formulae (VII), VIII and (IX) wherein --.

In column 30

Line 31 should read:

-- (VIII) and (IX). --.

UNITED STATES PATENT AND TRADEMARK OFFICE
CERTIFICATE OF CORRECTION

PATENT NO. : 7,081,540 B2
APPLICATION NO. : 10/475479
DATED : July 25, 2006
INVENTOR(S) : Roman Lenz et al.

It is certified that error appears in the above-identified patent and that said Letters Patent is hereby corrected as shown below:

<u>In column 31</u>

Line 42 should read:

-- with the proviso that compounds fo formulae (VII), (VIII) --.

Signed and Sealed this

Tenth Day of April, 2007

JON W. DUDAS
*Director of the United States Patent and Trademark Office*